(12) United States Patent
Li

(10) Patent No.: US 7,519,274 B2
(45) Date of Patent: Apr. 14, 2009

(54) FILE FORMAT FOR MULTIPLE TRACK DIGITAL DATA

(75) Inventor: Adam H. Li, San Diego, CA (US)

(73) Assignee: Divx, Inc., San Diego, CA (US)

( * ) Notice: Subject to any disclaimer, the term of this patent is extended or adjusted under 35 U.S.C. 154(b) by 1189 days.

(21) Appl. No.: 10/731,809

(22) Filed: Dec. 8, 2003

(65) Prior Publication Data

US 2005/0123283 A1 Jun. 9, 2005

(51) Int. Cl.
*H04N 7/00* (2006.01)
*H04N 5/00* (2006.01)
*H04N 5/14* (2006.01)
*H04N 5/445* (2006.01)
*H04N 7/12* (2006.01)
*H04N 9/74* (2006.01)
*H04L 12/66* (2006.01)
*H04J 3/18* (2006.01)
*G06F 13/00* (2006.01)
*G06F 15/16* (2006.01)
*G06F 15/173* (2006.01)

(52) U.S. Cl. .................... 386/95; 386/125; 348/462; 348/465; 348/467; 348/468; 348/564; 348/578; 348/699; 370/463; 370/477; 375/240.11; 375/240.15; 375/240.16; 375/240.18; 375/240.25; 709/203; 709/217; 709/219; 709/224; 709/231; 709/236; 719/318

(58) Field of Classification Search .................. 386/95, 386/125, E5.004, E9.04, E9.013, E9.017; 340/5.84; 348/462, 465, 467, 468, 564, 578, 348/699, E5.051, E7.035; 358/1.9; 370/463, 370/477; 375/240.11, 240.15, 240.16, 240.18, 375/240.25, E7.008, E7.026, E7.091, E7.093, 375/E7.027, E7.126, E7.144, E7.211, E7.218, 375/E7.226, E7.231, E7.272; 379/93.03, 379/283, 361; 704/246, 270.1, 273, E17.003; 705/27, 54; 709/203, 217, 219, 224, 231, 709/236; 719/318; 726/16
See application file for complete search history.

(56) References Cited

U.S. PATENT DOCUMENTS

| | | | |
|---|---|---|---|
| 4,802,170 A | 1/1989 | Trottier | |
| 4,964,069 A | 10/1990 | Ely | |
| 5,119,474 A | 6/1992 | Beitel et al. | |
| 5,274,758 A | 12/1993 | Beitel et al. | |
| 5,396,497 A | 3/1995 | Veltman | |
| 5,420,801 A | 5/1995 | Dockter et al. | |
| 5,420,974 A | 5/1995 | Morris et al. | |
| 5,471,576 A | 11/1995 | Yee | |
| 5,487,167 A | 1/1996 | Dinallo et al. | |
| 5,533,021 A | 7/1996 | Branstad et al. | |
| 5,537,408 A | 7/1996 | Branstad et al. | |
| 5,539,908 A | 7/1996 | Chen et al. | |
| 5,541,662 A | 7/1996 | Adams et al. | |
| 5,583,652 A | 12/1996 | Ware | |
| 5,627,936 A | 5/1997 | Prasad | |
| 5,633,472 A | 5/1997 | DeWitt et al. | |
| 5,642,171 A | 6/1997 | Baumgartner et al. | |
| 5,655,117 A | 8/1997 | Goldberg et al. | |
| 5,664,044 A | 9/1997 | Ware | |
| 5,675,382 A * | 10/1997 | Bauchspies | ............ 375/240.25 |
| 5,675,511 A | 10/1997 | Prasad et al. | |
| 5,684,542 A * | 11/1997 | Tsukagoshi | ................. 348/468 |
| 5,719,786 A * | 2/1998 | Nelson et al. | ............... 709/219 |
| 5,763,800 A | 6/1998 | Rossum et al. | |
| 5,765,164 A | 6/1998 | Prasad et al. | |
| 5,794,018 A | 8/1998 | Vrvilo et al. | |
| 5,822,524 A | 10/1998 | Chen et al. | |
| 5,828,370 A | 10/1998 | Moeller et al. | |
| 5,903,261 A | 5/1999 | Walsh et al. | |
| 5,907,597 A * | 5/1999 | Mark | ...................... 379/93.03 |
| 5,956,729 A | 9/1999 | Goetz et al. | |
| 5,959,690 A * | 9/1999 | Toebes et al. | ............... 348/578 |
| 6,065,050 A | 5/2000 | DeMoney | |
| 6,169,242 B1 | 1/2001 | Fay et al. | |
| 6,395,969 B1 * | 5/2002 | Fuhrer | ..................... 84/477 R |

(Continued)

FOREIGN PATENT DOCUMENTS

JP 02001043668 A 2/2001

OTHER PUBLICATIONS

Microsoft Corporation, Chapter 8, Multimedia File Formats 1991, Microsoft windows Multimedia Programmer's Reference, 3 cover pages, pp. 8-1 to 8-20.*
Darek Blaskiak, PH.D., "Video Transrating and Transcoding: Overview of Video Transrating and Transcoding Technologies," pp. 1-22, Ingenient Technologies, Aug. 6, 2002, Houston, TX, USA.
Mark Nelson, "Arithmetic Coding + Statistical Modeling = Data Compression: Part 1—Arithmetic Coding," pp. 1-12, Doctor Dobb's Journal, Feb. 1991, USA.
Author Unknown, "Entropy and Source Coding (Compression)," pp. 1-22, TCOM 570, 1999, USA.

(Continued)

*Primary Examiner*—Thai Tran
*Assistant Examiner*—Syed Y Hasan
(74) *Attorney, Agent, or Firm*—Kauth, Pomeroy, Peck & Bailey LLP

(57) ABSTRACT

A file for storing digital data with high compression rate stores digital data for video and audio signals in multiple streams interleaved with each other. Each track has a stream descriptor list and a stream data list. The stream descriptor list includes a stream header chunk, a stream format chunk, and a stream name chunk. For a video stream, the stream descriptor list also includes a stream header data chunk if the video stream is under digital rights management (DRM) protection. The file format is compatible with high level data compressing algorithms, such as MPEG-4, which provide data compression ratio about six to ten times higher than a standard DVD format.

85 Claims, No Drawings

U.S. PATENT DOCUMENTS

| | | | |
|---|---|---|---|
| 6,665,835 | B1 | 12/2003 | Gutfreund et al. |
| 6,671,408 | B1 | 12/2003 | Kaku |
| 6,697,568 | B1 | 2/2004 | Kaku |
| 6,725,281 | B1* | 4/2004 | Zintel et al. ............... 719/318 |
| 6,856,997 | B2 | 2/2005 | Lee et al. |
| 6,917,652 | B2* | 7/2005 | Lyu .................... 375/240.25 |
| 6,944,629 | B1 | 9/2005 | Shioi et al. |
| 6,988,144 | B1* | 1/2006 | Luken et al. ............... 709/231 |
| 7,209,892 | B1* | 4/2007 | Galuten et al. ............... 705/26 |
| 2002/0051494 | A1 | 5/2002 | Yamaguchi et al. |
| 2002/0062313 | A1* | 5/2002 | Lee et al. .................... 707/3 |
| 2002/0091665 | A1 | 7/2002 | Van Beek et al. |
| 2002/0093571 | A1 | 7/2002 | Hyodo |
| 2002/0110193 | A1 | 8/2002 | Yoo et al. |
| 2002/0143413 | A1 | 10/2002 | Fay et al. |
| 2002/0143547 | A1 | 10/2002 | Fay et al. |
| 2002/0161462 | A1 | 10/2002 | Fay et al. |
| 2002/0184129 | A1 | 12/2002 | Schwartz et al. |
| 2002/0184159 | A1* | 12/2002 | Tadayon et al. ............... 705/54 |
| 2002/0191960 | A1* | 12/2002 | Fujinami et al. ............ 386/95 |
| 2003/0001964 | A1 | 1/2003 | Masukura et al. |
| 2003/0035488 | A1 | 2/2003 | Barrau |
| 2003/0093799 | A1 | 5/2003 | Kauffman et al. |
| 2003/0165328 | A1 | 9/2003 | Grecia |
| 2003/0185302 | A1 | 10/2003 | Abrams |
| 2003/0185542 | A1 | 10/2003 | McVeigh et al. |
| 2003/0206558 | A1* | 11/2003 | Parkkinen et al. ........... 370/477 |
| 2004/0006701 | A1 | 1/2004 | Kresina |
| 2004/0021684 | A1* | 2/2004 | B. Millner ................... 345/719 |
| 2004/0052501 | A1 | 3/2004 | Tam |
| 2004/0114687 | A1* | 6/2004 | Ferris et al. ............. 375/240.11 |
| 2004/0143760 | A1* | 7/2004 | Alkove et al. ................ 713/201 |
| 2004/0146276 | A1 | 7/2004 | Ogawa |
| 2005/0055399 | A1* | 3/2005 | Savchuk ..................... 709/203 |
| 2006/0274835 | A1* | 12/2006 | Hamilton et al. ......... 375/240.25 |

OTHER PUBLICATIONS

Nam Phamdo, "Theory of Data Compression," pp. 1-12, publication date unknown, USA.

Author Unknown, "MPEG-4 Video Encoder: Based on International Standard ISO/IED 14496-2," pp. 1-15, Patni Computer Systems, Ltd., publication date unknown, USA.

Microsoft Corporation, "Chapter 8, Multimedia File Formats" 1991, Microsoft Windows Multimedia Programmer's Reference, 3 cover pgs, pp. 8-1 to 8-20.

Morrison, "EA IFF 85" Standard for Interchange Format Files, Jan. 14, 1985, printed from http://www.dcs.ed.ac.uk/home/mxr/gfx/2d/IFF.txt on Mar. 6, 2006, 24 pgs.

IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.

OpenDML AVI-M-JPEG File Format Subcommittee, "OpenDML AVI File Format Extensions", Version 1.02, Feb. 28, 1996, 29 pgs.

Author Unknown, AVI RIFF File Reference (Direct X 8.1 C++ Archive), printed from http://msdn.microsoft.com/archive/en-us/dx81_c/directx_cpp/htm/avirifffilereference.asp?fr... on Mar. 6, 2006, 7 pgs.

"OpenDML AVI File Format Extensions", www.the-labs.com/Video/odmlffZ-avidef.pdf, Authored by the OpenDML AVI M-JPEG File Format Subcommittee,(Sep. 1, 1997).

Windows Media Center Extender for Xbox, printed May 9, 2007 from http://www.xbox.com/en-US/support/systemuse/xbox/console/mediacenterextender.htm, 2 pgs.

Windows® XP Media Center Edition 2005 from http://download.microsoft.com/download/c/9/a/c9a7000a-66b3-455b-860b-1c16f2eecfec/MCE.pdf, 2 pgs.

Mircrosoft Windows® XP Media Center Edition 2005: Features, printed May 9, 2007, from http://www.microsoft.com/windowsxp/mediacenter/evaluation/features.mspx, 4 pgs.

Microsoft Windows® XP Media Center Edition 2005, Frequently asked Questions, printed May 4, 2007 from http://www.microsoft.com/windowsxp/mediacenter/evaluation/faq.mspx.

Linksys® : "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p.

Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.

PC WORLD.COM, Future Gear: PC on the HiFi, and the TV, from http://www.pcworld.com/article/id,108818-page,1/article.html, printed May 4, 2007, from IDG Networks, 2 pgs.

Wi-Fi Planet, The Wireless Digital Picture Frame Arrives, printed May 4, 2007 from http://www.wi-fiplanet.com/news/article.php/3093141, 3 pgs.

TAXAN, A Vel LinkPlayer2 for Consumer, I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 pg.

Linksys, KISS DP-500, printed May 4, 2007 from http://www.kiss-technology.com/?p=dp500, 2 pgs.

KISS DP-500 from http://www.kiss-technology.com/?p=dp500, 10 KISS Players, 1 pg.

* cited by examiner

FILE FORMAT FOR MULTIPLE TRACK DIGITAL DATA

FIELD OF THE INVENTION

The present invention relates, in general, to data storage and archiving and, more specifically, to file formats for storing multiple tracks or streams of data.

BACKGROUND OF THE INVENTION

Thanks to its fidelity, digital video and audio have become increasingly popular in entertainment and information recording. For example, digital versatile disc or digital video disc (DVD) provides a format used to store movies, music, or software programs. A DVD movie often has multiple audio tracks for multilingual presentation of the movie and/or multiple video tracks for including special features such as interviews with the movie producer, movie trailers, etc. A DVD has a memory capacity of approximately six gigabytes (GB). In the standard format, a single sided DVD generally can store approximately two to three hours of video.

It would be advantageous to have a file format for storing digital data with a high compression rate. It would be desirable for the file format to be capable of storing data in multiple streams or tracks. It would also be desirable for the file format to be able to encode and archive video, audio, and text data on easily accessible streams or tracks. It would be of further advantage for the file format to be able to provide copyright protection for the digitized content.

DETAILED DESCRIPTION OF VARIOUS EMBODIMENTS

In accordance with preferred embodiments of the present invention, digitized data, e.g., digital video, audio, and/or text data, are encoded and stored in a multimedia file following a format that is compatible with a standard data coding and compression algorithm. The file is readable and/or executable by a processor, e.g., a specific or generic signal processor, a digital signal processor (DSP), a signal processor on an Application Specific Integrated Circuit (ASIC), an Advanced RISC Machine (ARM) microprocessor, etc.

In accordance with a specific embodiment of the present invention, the file format is based on the audio video interleave (AVI) multimedia format. The AVI file format is a Resource Interchange File Format (RIFF) file specification used with applications that capture, edit, and play back audio-video sequences.

RIFF, introduced in 1991 by Microsoft Corporation and IBM Corporation, is a format for storing tagged data structures. The structure and coding of RIFF can be found at the Microsoft Developer Network (http://msdn.microsoft.com/). The related information on the Microsoft Developer Network is incorporated herein by reference.

A RIFF file includes a RIFF header followed by zero or more lists and chunks. The RIFF header has the following form:

'RIFF' fileSize fileType (data)

where 'RIFF' is a four character code (FOURCC) that has the value 'RIFF', fileSize is a 4 byte number giving the size of the data in the file, and fileType is a FOURCC that identifies the specific file type. The value of fileSize includes the size of the fileType FOURCC and the size of the data that follows, but does not include the size of the 'RIFF' FOURCC or the size of fileSize. The file data includes data chunks and lists, in any order.

A chunk has the form:
ckID ckSize ckData where ckID is a FOURCC that identifies the data contained in the chunk, ckData is a 4 byte number giving the size of the data in ckData, and ckData is zero or more bytes of data. The data is always padded to nearest WORD boundary. ckSize gives the size of the valid data in the chunk, but it does not include the padding, the size of ckID, or the size of ckSize.

A list is an ordered collection of other chunks, for example a collection of movie frames. In RIFF, a list has the form:

'LIST' listSize listType listData where 'LIST' is the literal FOURCC code 'LIST', listSize is a 4 byte number giving the size of the list, listType is a FOURCC code identifying the type of the list, and listData consists of chunks or lists, in any order. The value of listSize includes the size of listType plus the size of listData, but it does not include the 'LIST' FOURCC or the size of listSize.

It is customary and efficient to imply the chunk size and adopt a simplified notation to represent a RIFF chunk:
ckID (ckData)

Adopting a similar simplified notation, a list can be represented as:
'LIST' (listType (listData))

The notation places optional elements in brackets, [optional element]

An AVI file is identified by a FOURCC 'AVI' in the RIFF header. All AVI files include two mandatory LIST chunks: the stream format and the stream data. An AVI file may also include an index chunk, which gives the location of the data chunks within the file. An AVI file with these components has the form:

```
RIFF          ('AVI '
                  ['CSET' (Character Set)]
                  [LIST ('INFO')]
                  LIST ('hdrl' ...)
                  LIST ('movi' ...)
                  ['idx1' (<AVI Index>)]
              )
```

The 'hdrl' list defines the format of the data and is the first required LIST chunk. The 'movi' list contains the data for the AVI sequence and is the second required LIST chunk. The 'idx1' list contains the index, which is optional. AVI files keep these three components in the proper sequence.

The 'hdrl' and 'movi' lists use subchunks for their data. The following example shows the AVI RIFF form expanded with the chunks needed to complete these lists:

```
RIFF     ('AVI '
             ['CSET' (Character Set)]
             [LIST ('INFO')]
             LIST ('hdrl'
                      'avih'(<Main AVI Header>)
                  LIST ('strl'
                           'strh'(<Stream header>)
                           'strf'(<Stream format>)
                           ['strd'(<Additional header data>)]
                           ['strn'(<Stream name>)]
                           ...
                       )
                   ...
                  )
```

```
            LIST ('movi'
                    {SubChunk | LIST ('rec '
                                    SubChunk1
                                    SubChunk2
                                    ...
                                    )
                                    ...
                    }
                    ...
                    )
            ['idx1' (<AVI Index>)]
    )
```

The character set (CSET) chunk is typically used to define a character set and language information for a RIFF file, a LIST, or a stream. The CSET chunk is defined as follows:

```
        CSET            (
                        WORD wCodePage
                        WORD wCountryCode
                        WORD wLanguageCode
                        WORD wDialect
                        )
```

In accordance with a preferred embodiment of the present invention, the functions and formats of the fields in the CSET chunk are defined as follows:

wCodePage specifies the code page used for file elements. If the CSET chunk is not present or if this field has a value of zero, a standard ISO 8859/1 code page (identical to code page 1004 without code points defined in hex columns 0, 1, 8, and 9) is assumed in accordance with an embodiment of the present invention.

wCountryCode specifies the country code used for file elements. If the CSET chunk is not present or if this field has value zero, USA (country code 001) is assumed in accordance with an embodiment of the present invention. By way of example, the country codes used in the wCountryCode field of CSET chunk are listed in Table 1.

wLanguage and wDialect specify the language and dialect used for file elements. If the CSET chunk is not present or if these fields have value zero, US English (language code 9, dialect code 1) is assumed in accordance with an embodiment of the present invention. By way of example, the language and dialect codes used in the wLanguage and wDialect fields of CSET chunk are listed in Table 2.

The information 'INFO' list is a registered global form type that can store information, e.g., copyright information and comments, that helps identify the contents of the chunk. This information, although useful, does not affect the way a program interprets the file. An 'INFO' list is a 'LIST' chunk with list type 'INFO'.

In accordance with a preferred embodiment, an 'INFO' list may contains the chunks listed in Table 3. Additional chunks may be defined. Preferably, an application ignores any chunk it doesn't understand. Each chunk contains a null-terminated Unicode text string. The character set used in the string is specified by the global CSET chunk.

The AVI file header ('hdrl') list includes a main AVI header in an 'avih' chunk. One or more stream descriptor lists follow the main AVI header. Each stream descriptor is contained in an 'strl' list.

The main AVI header contains global information for the entire AVI file, such as the number of streams within the file and the width and height of the AVI sequence. The main header chunk includes an AVIMAINHEADER structure, whose syntax is defined as:

```
        typedef struct __avimainheader {
            FOURCC          fcc;
            DWORD           cb;
            DWORD           dwMicroSecPerFrame;
            DWORD           dwMaxBytesPerSec;
            DWORD           dwPaddingGranularity;
            DWORD           dwFlags;
            DWORD           dwTotalFrames;
            DWORD           dwInitialFrames;
            DWORD           dwStreams;
            DWORD           dwSuggestedBufferSize;
            DWORD           dwWidth;
            DWORD           dwHeight;
            DWORD           dwReserved[4];
        } AVIMAINHEADER
```

In accordance with a preferred embodiment, the members in the AVIMAINHEADER structure have the following variables:

fcc specifies a FOURCC code with the value being 'avih'.
cb specifies the size of the structure, not including the initial 8 bytes of fcc and cb.
dwMicroSecPerFrame
   specifies the number of microseconds between frames and indicates the overall timing for the file.
dwMaxBytesPerSec
   specifies the approximate maximum data rate of the file. This value indicates the number of bytes per second the system must handle to present an AVI sequence as specified by other parameters contained in the main header and stream header chunks.
dwPaddingGranularity
   specifies the alignment for data, in bytes. Data are padded to multiples of this value.
dwFlags
   includes a bitwise combination of zero or more of the following flags:
   AVIF_HASINDEX—Indicates the AVI file has an index.
   AVIF_MUSTUSEINDEX—Indicates that the application should use the index, instead of the physical ordering of the chunks in the file, to determine the order of presentation of the data. For example, this flag could be used to create a list of frames for editing.
   AVIF_ISINTERLEAVED—Indicates the AVI file being interleaved.
   AVIF_WASCAPTUREFILE—Indicates the AVI file as a specially allocated file used for capturing real-time video. Applications should warn the user before writing over a file with this flag set because the user may defragment this file.
   AVIF_COPYRIGHTED—Indicates the AVI file contains copyrighted data and software. When this flag is used, software should not permit the data to be duplicated.
dwTotalFrames
   specifies the total number of frames of data in the file.
dwInitialFrames
   specifies the initial frame for interleaved files. For non-interleaved files the value should specify zero. When creating interleaved files, the number of frames in the file should be specified prior to the initial frame of the AVI sequence in this member.

dwStreams specifies the number of streams in the file. For example, a file with audio and video has at least two streams.

dwSuggestedBufferSize specifies the suggested buffer size for reading the file. Preferably, this size should be large enough to contain the largest chunk in the file. If set to zero, or too small, the playback software will have to reallocate memory during playback, which will reduce performance. For an interleaved file, the buffer size should be large enough to read an entire record, and not just a chunk.

dwWidth specifies the width of the AVI file in pixels.

dwHeight:

specifies the height of the AVI file in pixels.

dwReserved reserved, set to zero.

By way of example, the flags in the member dwFlags include the following bitwise combinations:

```
/* flags for use in <dwFlags> in AVIFileHdr */
#define AVIF_HASINDEX        0x00000010
#define AVIF_MUSTUSEINDEX    0x00000020
#define AVIF_ISINTERLEAVED   0x00000100
#define AVIF_TRUSTCKTYPE     0x00000800
#define AVIF_WASCAPTUREFILE  0x00010000
#define AVIF_COPYRIGHTED     0x00020000
```

TABLE 1

Country codes (wCountryCode)

| Country Code (wCountryCode) | Country or Region |
|---|---|
| 000 | None (ignore this field) |
| 001 | USA |
| 002 | Canada |
| 003 | Latin America |
| 030 | Greece |
| 031 | Netherlands |
| 032 | Belgium |
| 033 | France |
| 034 | Spain |
| 039 | Italy |
| 041 | Switzerland |
| 043 | Austria |
| 044 | United Kingdom |
| 045 | Denmark |
| 046 | Sweden |
| 047 | Norway |
| 049 | Germany |
| 052 | Mexico |
| 055 | Brazil |
| 061 | Australia |
| 064 | New Zealand |
| 081 | Japan |
| 082 | Korea |
| 086 | People's Republic of China |
| 088 | Taiwan |
| 090 | Turkey |
| 351 | Portugal |
| 352 | Luxembourg |
| 354 | Iceland |
| 358 | Finland |

TABLE 2

Language codes and dialect codes

| Language Code (wLanguage) | Dialect Code (wDialect) | Language |
|---|---|---|
| 0 | 0 | None (ignore these fields) |
| 1 | 1 | Arabic |
| 2 | 1 | Bulgarian |
| 3 | 1 | Catalan |
| 4 | 1 | Traditional Chinese |
| 4 | 2 | Simplified Chinese |
| 5 | 1 | Czech |
| 6 | 1 | Danish |
| 7 | 1 | German |
| 7 | 2 | Swiss German |
| 8 | 1 | Greek |
| 9 | 1 | US English |
| 9 | 2 | UK English |
| 10 | 1 | Spanish |
| 10 | 2 | Spanish Mexican |
| 11 | 1 | Finnish |
| 12 | 1 | French |
| 12 | 2 | Belgian French |
| 12 | 3 | Canadian French |
| 12 | 4 | Swiss French |
| 13 | 1 | Hebrew |
| 14 | 1 | Hungarian |
| 15 | 1 | Icelandic |
| 16 | 1 | Italian |
| 16 | 2 | Swiss Italian |
| 17 | 1 | Japanese |
| 18 | 1 | Korean |
| 19 | 1 | Dutch |
| 19 | 2 | Belgian Dutch |
| 20 | 1 | Norwegian - Bokmal |
| 20 | 2 | Norwegian - Nynorsk |
| 21 | 1 | Polish |
| 22 | 1 | Brazilian Portuguese |
| 22 | 2 | Portuguese |
| 23 | 1 | Rhaeto-Romanic |
| 24 | 1 | Romanian |
| 25 | 1 | Russian |
| 26 | 1 | Serbo-Croatian (Latin) |
| 26 | 2 | Serbo-Croatian (Cyrillic) |
| 27 | 1 | Slovak |
| 28 | 1 | Albanian |
| 29 | 1 | Swedish |
| 30 | 1 | Thai |
| 31 | 1 | Turkish |
| 32 | 1 | Urdu |
| 33 | 1 | Bahasa |

TABLE 3

Information List (INFO) chunks

| Chunk ID | Description |
|---|---|
| IARL | Archival Location, indicating where the subject of the file is archived. |
| IART | Artist, listing the artist of the original subject of the file. |
| ICMS | Commissioned, listing the name of the person or organization that commissioned the subject of the file. |
| ICMT | Comments, providing general comments about the file or the subject of the file, if multiple sentences in length, each sentence ending with a period, no new line characters. |
| ICOP | Copyright, recording the copyright information for the file, multiple copyrights separated by a semicolon followed by a space. |
| ICRD | Creation date, specifying the date the subject of the file was created, |

TABLE 3-continued

Information List (INFO) chunks

| Chunk ID | Description |
| --- | --- |
| | listing dates in year-month-day format, padding one-digit months and days with a zero on the left. |
| ICRP | Cropped, indicating whether an image has been cropped and, if so, how it was cropped, e.g., "lower right corner". |
| IDIM | Dimensions, specifying the size of the original subject of the file, e.g., 8.5 inches in height, 11 inches in width. |
| IDPI | Dots Per Inch, specifying dots per inch setting of the digitizer used to produce the file, such as 300. |
| IENG | Engineer, specifying the name of the engineer who worked on the file. If there are multiple engineers, the names are separated by a semicolon and a blank, e.g., Smith, John; Adams, Joe. |
| IGNR | Genre, describing the original work, such as, landscape, portrait, still life, etc. |
| IKEY | Keywords, providing a list of keywords that refer to the file or subject of the file, with multiple keywords separated with a semicolon and a blank, e.g., "Seattle; aerial view; scenery". |
| ILGT | Lightness, describing the changes in lightness settings on the digitizer required to produce the file, its format depending on hardware used. |
| IMED | Medium, describing the original subject of the file, e.g., computer image, drawing, lithograph. |
| INAM | Name, storing the title of the subject of the file, such as, "Seattle From Above". |
| IPLT | Palette Setting specifying the number of colors requested when digitizing an image. |
| IPRD | Product, specifying the name of the product, for which the file was originally intended, e.g., "Encyclopedia of Pacific Northwest Geography". |
| ISBJ | Subject, describing the contents of the file, e.g., "Aerial view of Seattle". |
| ISFT | Software, identifying the name of the software package used to create the file, e.g., "Microsoft WaveEdit". |
| ISHP | Sharpness, identifying the changes in sharpness for the digitizer required to produce the file, its format depending on the hardware used. |
| ISRC | Source, identifying the person or organization that supplied the original subject of the file. |
| ISRF | Source Form, identifying the original form of the material that was digitized, e.g., slide, paper, map, which may be different from IMED. |
| ITCH | Technician, identifying the technician who digitized the subject file. |

One or more steam descriptor ('strl') lists follow the main header 'hdrl'. Each 'strl' list corresponds to a data stream and includes information about the data stream in the file. A 'strl' list contains a stream header chunk ('strh') and a stream format chunk ('strf'). In addition, a 'strl' list may contain a stream header data chunk ('strd') and a stream name chunk ('strn'). The stream descriptors in the 'hdrl' list are associated with the stream data in the 'movi' list according to the order of the 'strl' lists. The first 'strl' list applies to stream 0, the second applies to stream 1, and so forth.

The stream header chunk ('strh') in the 'strl' list includes an AVISTREAMHEADER structure containing information about a stream in the AVI file. The AVISTREAMHEADER structure has the syntax:

```
typedef struct _avistreamheader {
    FOURCC    fcc;
    DWORD     cb;
    FOURCC    fccType;
    FOURCC    fccHandler;
    DWORD     dwFlags;
    WORD      wPriority;
    WORD      wLanguage;
    DWORD     dwInitialFrames;
    DWORD     dwScale;
    DWORD     dwRate;
    DWORD     dwStart;
    DWORD     dwLength;
    DWORD     dwSuggestedBufferSize;
    DWORD     dwQuality;
    DWORD     dwSampleSize;
    struct    {
        WORD  left;
        WORD  top;
        WORD  right;
        WORD  bottom;
    } rcFrame;
} AVISTREAMHEADER
```

In accordance with a preferred embodiment, the members in the AVISTREAMHEADER structure have following variables:

fcc specifies a FOURCC, with the value being 'strh'.

cb specifies the size of the structure, not including the initial 8 bytes.

fccType
  contains a FOURCC that specifies the type of the data in the stream, with the following standard AVI values for video and audio:
  'auds' Audio stream
  'mids' MIDI stream
  'txts' Text stream
  'vids' Video stream fccHandler
  optional, may contain a FOURCC that identifies a specific data handler preferred handler for the stream. For audio and video streams, this specifies the codec for decoding the stream.

dwFlags
  contains flags for the data stream. The bits in the high-order word of these flags are specific to the type of data contained in the stream. The standard flags are:
  AVISF_DISABLED—Indicates the stream should not be enabled by default.
  AVISF_VIDEO_PALCHANGES—Indicates the video stream contains palette changes, thereby warning the playback software that it will need to animate the palette.

dwPriority
  specifies the priority of a stream type. For example, in a file with multiple audio streams, the one with the highest priority might be the default stream.

dwInitialFrames
  specifies how far audio data is skewed ahead of the video frames in interleaved files, e.g., 0.75 seconds. For an interleaved file, dwInitialFrames specifies the number of frames in the file prior to the initial frame of the AVI sequence.

dwScale
specifies, in combination with dwRate, the time scale that the stream will use.

dwRate
specifies, in combination with dwScale, the time scale that the stream will use. Dividing dwRate by dwScale gives the number of samples per second. For video streams, this is the frame rate. For audio streams, this rate corresponds to the time needed to play nBlockAlign bytes of audio. For pulse code modulation (PCM) audio this rate corresponds to sample rate.

dwStart
specifies the starting time for this stream, with units defined by the dwRate and dwScale members in the main file header. Usually, its value is zero. A nonzero value specifies a delay time for a stream that does not start concurrently with the file.

dwLength
specifies the length of the stream. The units are defined by dwRate and dwScale.

dwSuggestedBufferSize
specifies how large a buffer should be used to read this stream. Preferably, it has a value corresponding to the largest chunk present in the stream. Using the correct buffer size makes playback more efficient. The value can be set to zero if the correct buffer size is unknown.

dwQuality
specifies the quality of the data in the stream, represented as a number between 0 and 10,000. For compressed data, this typically represents the value of the quality parameter passed to the compression software. If set to −1, drivers use the default quality value.

dwSampleSize
specifies the size of a single sample of data. This is set to zero if the samples can vary in size. For nonzero values, multiple samples of data can be grouped into a single chunk within the file. For a value of zero, each sample of data, e.g., a video frame, must be in a separate chunk. For video streams, the value is typically zero, although it can be nonzero if all video frames are the same size. For audio streams, the value should be the same as the nBlockAlign member of the WAVEFORMATEX structure describing the audio.

rcFrame
specifies, in pixels, the destination rectangle for a text or video stream within the movie rectangle specified by the dwwidth and dwHeight members of the AVI main header structure. The rcFrame member is typically used in support of multiple video streams. The rectangle is preferably set to the coordinates corresponding to the movie rectangle to update the whole movie rectangle. The upper left corner of the destination rectangle is relative to the upper left corner of the movie rectangle. In accordance with the present invention the members in RcFrame may be defined as DWORD as well as WORD.

A stream format ('strf') chunk follows the stream header ('strl') chunk. The stream format chunk describes the format of the data in the stream. The data contained in this chunk depends on the stream type.

For video streams, the information is a BITMAPINFOHEADER structure, including palette information if appropriate. The structure of BITMAPINFOHEADER is defined as:

```
typedef struct BITMAPINFOHEADER {
    DWORD       biSize;
    LONG        biWidth;
    LONG        biHeight;
    WORD        biPlanes;
    WORD        biBitCount;
    DWORD       biCompression;
    DWORD       biSizeImage;
    LONG        biXPelsPerMeter;
    LONG        biYPelsPerMeter;
    DWORD       biClrUsed;
    DWORD       biClrImportant;
} BITMAPINFOHEADER
```

In accordance with a preferred embodiment, the members in the BITMAPINFOHEADER structure have following variables:

BiSize
specifies the number of bytes required by the structure.

BiWidth
specifies the width of the bitmap in pixels, or specifies the width of the decompressed JPEG image file for Microsoft Windows 98, Windows NT 5.0 and later versions if bicompression is BI_JPEG.

BiHeight
specifies the height of the bitmap in pixels, or specifies the height of the decompressed JPEG image file for Microsoft Windows 98, Windows NT 5.0 and later versions if biCompression is BI_JPEG. If biHeight is positive, the bitmap is a bottom-up device independent bitmap (DIB) and its origin is the lower-left corner. If biHeight is negative, the bitmap is a top-down DIB and its origin is the upper-left corner.

biplanes
specifies the number of planes for the target device. This value is set to 1.

biBitCount
specifies the number of bits per pixel and determining the number of bits that define each pixel and the maximum number of colors in the bitmap. Its values and their meanings are:

0 for Windows 98, Windows NT 5.0, and later, the number of bits per pixel is specified or is implied by the JPEG format.

1 specifies that the bitmap is monochrome, and bmiColors contains two entries. Each bit in the bitmap array represents a pixel. If the bit is clear, the pixel is displayed with the color of the first entry in the bmiColors table. If the bit is set, the pixel has the color of the second entry in the table.

4 specifies that the bitmap has a maximum of 16 colors, and bmiColors contains up to 16 entries. Each pixel in the bitmap is represented by a 4-bit index into the color table. For example, if the first byte in the bitmap is 0x1F, the byte represents two pixels. The first pixel contains the color in the second table entry, and the second pixel contains the color in the sixteenth table entry.

8 specifies that the bitmap has a maximum of 256 colors, and bmiColors contains up to 256 entries. Each byte in the array represents a single pixel.

16 specifies that the bitmap has a maximum of $2^{16}$ colors. If biCompression is BI_RGB, bmiColors is NULL. Each WORD in the bitmap array represents a single pixel. The relative intensities of red, green, and blue are represented with 5 bits for each color component. The value for blue is in the least significant 5 bits, followed by 5 bits each for green and red. The most significant bit is not used. The bmiColors color table is used for optimizing colors used on palette-based devices, and contains the number of entries specified by biClrUsed. If bicompression is BI_BIT-FIELDS, bmiColors member contains three DWORD color masks that specify the red, green, and blue components, respectively, of each pixel. Each WORD in the bitmap array represents a single pixel. For Windows NT: When bicompression is BI_BITFIELDS, bits set in each DWORD mask are contiguous and should not overlap the bits of another mask. All the bits in the pixel do not have to be used.

For Windows 95 and Windows 98: When biCompression is BI_BITFIELDS, the system supports only the following 16 bits per pixel (bpp) color masks: A 5-5-5 16-bit image, where the blue mask is 0x001F, the green mask is 0x03E0, and the red mask is 0x7C00; and a 5-6-5 16-bit image, where the blue mask is 0x001F, the green mask is 0x07E0, and the red mask is 0xF800.

24 specifies that the bitmap has a maximum of $2^{24}$ colors, and the bmiColors member is NULL. Each 3-byte triplet in the bitmap array represents the relative intensities of blue, green, and red, respectively, for a pixel. The bmiColors color table is used for optimizing colors used on palette-based devices, and contains the number of entries specified by biClrUsed.

32 specifies that the bitmap has a maximum of $2^{32}$ colors. If the biCompression member of the BITMAPINFOHEADER is BI_RGB, the bmiColors member is NULL. Each DWORD in the bitmap array represents the relative intensities of blue, green, and red, respectively, for a pixel. The high byte in each DWORD is not used. The bmiColors color table is used for optimizing colors used on palette-based devices, and must contain the number of entries specified by biClrUsed.

If biCompression is BI_BITFIELDS, bmiColors contains three DWORD color masks that specify the red, green, and blue components, respectively, of each pixel. Each DWORD in the bitmap array represents a single pixel. For Windows NT: When biCompression is BI_BITFIELDS, bits set in each DWORD mask must be contiguous and should not overlap the bits of another mask. All the bits in the pixel do not need to be used.

For Windows 95 and Windows 98: When biCompression is BI_BITFIELDS, the system supports only the following 32 bpp color mask. The blue mask is 0x000000FF, the green mask is 0x0000FF00, and the red mask is 0x00FF0000.

BiCompression
specifies the type of compression for a compressed bottom-up bitmap. If biHeight is negative, indicating a top-down DIB, biCompression must be either BI_RGB or BI_BITFIELDS. Top-down DIBs cannot be compressed. The member can be one of the following values:

BI_RGB
specifies an uncompressed format.

BI_RLE8
specifies a run-length encoded (RLE) format for bitmaps with 8 bits per pixel. The compression format is a 2-byte format consisting of a count byte followed by a byte containing a color index.

BI_RLE4
specifies an RLE format for bitmaps with 4 bits per pixel. The compression format is a 2-byte format consisting of a count byte followed by two word-length color indexes.

BI_BITFIELDS
specifies that the bitmap is not compressed and that the color table consists of three DWORD color masks that specify the red, green, and blue components, respectively, of each pixel. This is valid when used with 16 bpp and 32 bpp bitmaps.

BI_JPEG
Indicates that the image is a JPEG image for Windows 98, Windows NT 5.0, and later versions.

BiSizeImage
specifies the size, in bytes, of the image. Its value may be set to zero for BI_RGB bitmaps. For Windows 98, Windows NT 5.0, and later versions: If bicompression is JBI_JPEG, biSizeImage indicates the size of the JPEG image buffer.

BiXPelsPerMeter
specifies the horizontal resolution, in pixels per meter, of the target device for the bitmap. An application can use this value to select a bitmap from a resource group that best matches the characteristics of the current device.

BiYPelsPerMeter
specifies the vertical resolution, in pixels per meter, of the target device for the bitmap.

BiClrUsed
specifies the number of color indexes in the color table that are actually used by the bitmap.

If BiClrUsed is zero, the bitmap uses the maximum number of colors corresponding to the value of the biBitCount for the compression mode specified by biCompression.

If biClrUsed is nonzero and biBitCount is less than 16, biClrUsed specifies the actual number of colors the graphics engine or device driver accesses. If biBitCount is 16 or greater, biClrUsed specifies the size of the color table used to optimize performance of the system color palettes. If biBitCount equals 16 or 32, the optimal color palette starts immediately following the three DWORD masks.

If the bitmap is a packed bitmap (a bitmap in which the bitmap array immediately follows the BITMAPINFOHEADER and is referenced by a single pointer), biClrUsed should be either zero or the actual size of the color table.

BiClrImportant
specifies the number of color indexes that are required for displaying the bitmap. If its value is zero, all colors are required.

For audio streams, the information is a WAVEFORMATEX structure. For text streams, the information has a TEXTINFO structure:

```
typedef _textinfo {
    WORD    wCodePage;
    WORD    wCountryCode;
    WORD    wLanguageCode;
    WORD    wDialect
} TEXTINFO
``` where the meaning of all the fields (wCodePage, wCountryCode, wLanguageCode, and wDialect) is the same as those defined above with reference to CSET chunk. Different languages can be set for each of the text streams in a file having multiple text streams.

If the optional stream header data ('strd') chunk is present in an AVI file, it follows the stream format chunk. The format and content of the 'strd' chunk are defined by the codec driver. Typically, drivers use this information for configuration. Applications that read and write AVI files do not need to interpret this information, they simple transfer it to and from the driver as a memory block.

The information block for achieving the digital rights management (DRM) protection in the AVI file is presented in the 'strd' chunk associated with the main video stream. The format of the DRM information data for the video stream in the 'strd' should be as following:

```
typedef _DRMinfo{
    WORD wVersion;
    STR sDRMInfo;
} DRMINFO
``` where the two members in the structure DRMINFO are defined as:

wVersion
    specifies the version of the DRM.

sDRMInfo
    specifies the information for the DRM protection, e.g., in an encrypted binary string.

The optional stream name 'strn' chunk includes a null terminated text string describing the stream. In accordance with an embodiment of the present invention, the string is "Video [—Description]" for a video stream, where optional [—Description] part is any string that describes the video stream, e.g., it can be "Video—Main". For an audio stream, the string can be "Audio [—Description]", where the optional [—Description] part is any string that describes the audio stream, e.g., it can be "Audio—English", "Audio—French", "Audio—Main", or "Audio—Auxiliary", etc. For a chapter stream, which is a text stream, the string can be "Chapter [—Description]", where the optional [—Description] part is any string that describes the chapter stream. For a subtitle stream, which can be either a text stream or a video stream, the string can be "Subtitle [—Description]", where the optional [—Description] part is any string that describes the subtitle stream, e.g., it can be "Subtitle—English", or "Subtitle—Chinese".

AVI stream data 'movi' list follows the header information in the AVI RIFF file format. The 'movi' list contains the actual data in the streams, e.g., the video frames and audio samples. The data chunks can reside directly in the 'movi' list, or be grouped together as subchunks within 'rec' lists. The 'rec' grouping implies that the grouped subchunks should be read from disk all at once, and is intended for files that are interleaved to play from CD-ROM.

Each data chunk in the 'movi' list is identified by a FOURCC that includes a two-digit stream number followed by a two-character code that defines the type of information in the chunk. In accordance with an embodiment of the present invention, the two-character codes for defining the data type are:

| | |
|---|---|
| db | uncompressed video frame |
| dc | compressed video frame |
| dd | DRM key info for the video frame |
| pc | palette change |
| wb | audio data |
| st | subtitle (text mode) |
| sb | subtitle (bitmap mode) |
| ch | chapter |

It should be noted that, in accordance with the present invention, additional two-character codes may be used to identify data streams not specified herein above.

By way of example, if stream 0 contains audio, the FOURCC for the stream would be '00wb'. If stream 1 contains video, the FOURCC for the stream would be '01db' for uncompressed video or '01dc' for compressed video. Video data chunks can also define new palette entries to update the palette during an AVI sequence. Each palette-change chunk ('xxpc') contains an AVIPALCHANGE structure. If a stream contains palette changes, the AVISF_VIDEO_PALCHANGES flag in the dwFlags member of the AVISTREAMHEADER structure for that stream is set accordingly.

The optional index list follows the 'movi' list in the AVI RIFF file format. The index contains a list of the data chunks and their location in the file. If the AVI file contains an index, the dwFlags member of the AVIMAINHEADER structure is set to AVIF_HASINDEX.

In version AVI 1.0, the index ('idx1') list includes an AVIOLDINDEX structure with entries for each data chunk, including 'rec' chunks. The AVIOLDINDEX structure has the syntax:

```
typedef struct _avioldindex {
    FOURCC      fcc;
    DWORD       cb;
    struct _avioldindex_entry {
        DWORD       dwChunkId;
        DWORD       dwFlags;
        DWORD       dwOffset;
        DWORD       dwSize;
    } aIndex [ ];
} AVIOLDINDEX
```

The members in the structure have following characters:

fcc    specifies a FOURCC code, with the value 'idx1'.
cb    specifies the size of the structure, not including the initial 8 bytes.
DwChunkId
    specifies a FOURCC that identifies a stream in the AVI file, having the form 'nnyy' where nn is the stream number and yy is a two-character code that identifies the contents of the stream:
    db    uncompressed video frame
    dc    compressed video frame
    pc    palette change
    wb    audio data
dwFlags
    specifies a bitwise combination of zero or more of the following flags:
    AVIIF_LIST    0x00000001L    // The data chunk is a 'rec ' list.

-continued

| | | |
|---|---|---|
| AVIIF_KEYFRAME is a key frame. | 0x00000010L | // The data chunk |
| AVIIF_NO_TIME does not affect the timing of the stream, e.g., for palette changes. | 0x00000100L | // The data chunk |
| AVIIF_NO_COMPUS for compressor use. | 0x0FFF0000L | // The data are |

DwOffset
  specifies the location of the data chunk in the file. In one embodiment, the value is specified as an offset, in bytes, from the start of the 'movi' list. In another embodiment, the value is the offset from the start of the file.
DwSize
  specifies the size of the data chunk, in bytes.

In accordance with a preferred embodiment, the AVIOLD-INDEX structure includes the initial RIFF chunk (the fcc and cb members) followed by one index entry for each data chunk in the 'movi' list. The AVIOLDINDEX structure describes an AVI 1.0 index ('idx1' format). New AVI files should use an AVI 2.0 index ('indx' format).

Additional data can be aligned in an AVI file by inserting 'JUNK' chunks as needed. Applications will ignore the contents of a 'JUNK' chunk.

In accordance with the present invention, the video tracks of one or more movies are stored in an AVI file as AVI video streams or tracks. A single AVI file may include multiple video tracks. Preferably, the first of the multiple video tracks is the main video track.

The stream descriptor ('strl') list for a video stream should include a stream header ('strh') chunk, a stream format ('strf'), a stream header data ('strd') chunk if the stream is DRM protected, and a stream name ('strn') chunk. In accordance with an embodiment of the present invention, the member fccType in the structure AVISTREAMHEADER the stream header ('strh') chunk for a video stream has the value 'vids'. The stream header data ('strd') chunk of a video stream should exist only for DRM protected video. If the 'strd' chunks exists, the video stream is protected, and there will be 'xxdd' DRM chunks in the video stream. The stream name data ('strn') chunk for a video stream includes a string of the form "Video [—Descriptions]".

The stream data ('movi') list of a video stream in includes an 'nndb' chunk for an uncompressed video data chunk or an 'nndc' for a compressed video data chunk, where 'nn' is a two digit data chunk index. If a video data chunk is DRM protected, the 'movi' list also includes a 'nndd' chunk preceding the corresponding 'nndb' or 'nndc' chunk of the protected video data chunk. In accordance with a specific embodiment of the present invention, the member dwFlags in the structure AVIOLDINDEX of the index entry for the 'nndd' chunk is set to AVIF_NO_TIME.

In one embodiment of the present invention, each video data chunk includes one video frame in variable bit rate coding. For video frames encoded in predicted frames (P frames) and bidirectional frames (B frames), a B frame is preferably placed in a chunk with the following P frame. In such cases, an uncoded dummy P frame (N in the following illustration) is preferably inserted by the codec to keep the timing. For example, a sequence of image frames (I frames), B frames, and P frames $I_m B_{m+1} P_{m+2} B_{m+3} P_{m+4} \ldots$ is preferably arranged into the following video stream chunk sequence:

$[I_m] [P_{m+2}, B_{m+1}] [N] [P_{m+4}, B_{m+3}] [N] \ldots$

In the expression, the square brackets indicate the data chunks in the AVI stream.

In accordance with the present invention, the audio tracks of one or more movies are stored in an AVI file as AVI audio streams or tracks. A single AVI file may include multiple audio tracks. Preferably, the first of the multiple audio tracks is the main audio track.

The stream descriptor ('strl') list for an audio stream should include a stream header ('strh') chunk, a stream format ('strf'), and a stream name ('strn') chunk. In accordance with a specific embodiment the 'strl' list for an audio stream does not include the stream header data ('strd') chunk. In this embodiment, the application should ignore any data chunk with the 'strd' code in the steam descriptor ('strl') list of the AVI file.

In accordance with an embodiment of the present invention, the member fccType in the structure AVISTREAMHEADER the stream header ('strh') chunk for a video stream has the value 'auds'. The stream name data ('strn') chunk for a video stream includes a string of the form "Audio [—Descriptions]".

The stream data ('movi') list of an audio stream in includes an 'nnwb' chunk for identifying an audio data chunk, where 'nn' is a two digit data chunk index. In one embodiment of the present invention, each audio data chunk includes one audio frame in variable bit rate coding. In another embodiment of the present invention, each audio data chunk includes one or more audio frames in constant bit rate coding.

In accordance with the present invention, the chapter tracks are stored in an AVI file as AVI text streams or tracks. A single AVI file may include multiple chapter tracks. The stream descriptor ('strl') list for a chapter stream should include a stream header ('strh') chunk, a stream format ('strf'), and a stream name ('strn') chunk. In accordance with a specific embodiment the 'strl' list for a chapter stream does not include the stream header data ('strd') chunk. In this embodiment, the application should ignore any data chunk with the 'strd' code in the steam descriptor ('strl') list of the AVI file.

In accordance with an embodiment of the present invention, the member fccType in the structure AVISTREANHEADER the stream header ('strh') chunk for a video stream has the value 'txts'. The stream format ('strf') chunk for a chapter stream has the TEXTINFO structure. The stream name data ('strn') chunk for a video stream includes a string of the form "Chapter [—Descriptions]".

The stream data ('movi') list of a chapter stream in includes an 'nnch' chunk for identifying a chapter data chunk, where 'nn' is a two digit data chunk index. In one embodiment of the present invention, each chapter data chunk has a CHAPTERCHUNK structure:

```
typedef struct _chapterchunk {
    FOURCC    fcc;
    DWORD     cb;
    STR       time;
    STR       description
} CHAPTERCHUNK
```

The members in the structure CHAPTERCHUNK are
fcc specifies a FOURCC code having the value 'nnxx'.
cb specifies the size of the structure, not including the initial 8 bytes.

time specifies the time at the starting of the chapter, having the form [hh:mm:ss.xxx], where hh is a two digit number representing the hours, mm a two digit number representing the minutes, ss a two digit number representing the seconds, and xxx a three digit number representing the milliseconds, of the starting point of the chapter.

Description
    specifies the name of the chapter or other description information.

The chapter stream is not a regular interval stream. In accordance with a specific embodiment of the present invention, the member dwFlags in the structure AVIOLDINDEX of the index entry for the 'nnch' chunk is set to AVIF_NO_TIME.

In accordance with one embodiment of the present invention, the subtitle tracks are stored in an AVI file as AVI text streams or tracks. In accordance with another embodiment of the present invention, the subtitle tracks are stored in an AVI file as AVI bitmap streams or tracks. A single AVI file may include multiple subtitle tracks. The stream descriptor ('strl') list for a subtitle stream should include a stream header ('strh') chunk, a stream format ('strf'), and a stream name ('strn') chunk. In accordance with a specific embodiment the 'strl' list for a subtitle stream does not include the stream header data ('strd') chunk. In this embodiment, the application should ignore any data chunk with the 'strd' code in the steam descriptor ('strl') list of the AVI file.

In accordance with an embodiment of the present invention, the member fccType in the structure AVISTREAMHEADER the stream header ('strh') chunk for a video stream has the value 'txts' for text form subtitles or 'vids' for bitmap form subtitles. The stream format ('strf') chunk for a subtitle stream has the TEXTINFO structure for text form subtitles and the BITMAPINFOHEADER structure for bitmap form subtitles. The stream name data ('strn') chunk for a video stream includes a string of the form "Subtitle [—Descriptions]".

The stream data ('movi') list of a subtitle stream includes an 'nnst' chunk for identifying a text form subtitle data chunk and/or an 'nnsb' chunk for identifying a bitmap form subtitle data chunk, where 'nn' is a two digit data chunk index. In one embodiment of the present invention, each subtitle data chunk has a SUBTITLECHUNK structure:

```
typedef struct _subtitlechunk {
    FOURCC    fcc;
    DWORD     cb;
    STR       duration;
    STR       subtitle
} SUBTITLECHUNK
```

The members in the structure SUBTITLECHUNK are
fcc specifies a FOURCC code having the value 'nnxx'.
cb specifies the size of the structure, not including the initial 8 bytes.
duration
    specifies the time at the starting of the chapter, having the form [hh:mm:ss.xxx—HH:MM:SS:XXX], where hh and HH are a two digit numbers representing the hours, mm and MM two digit numbers representing the minutes, ss and SS two digit numbers representing the seconds, and xxx and XXX three digit numbers representing the milliseconds, of the starting point and ending point, respectively, for displaying the subtitles.

subtitle
    contains either the Unicode text of the subtitles for text mode, or a compressed bitmap image of the subtitles for bitmap mode.

The subtitle stream is not a regular interval stream. In accordance with a specific embodiment of the present invention, the member dwFlags in the structure AVIOLDINDEX of the index entry for the subtitle chunk is set to AVIF_NO_TIME.

For bitmap format subtitles, it is preferred to have compressed subtitle bitmaps in the subtitle field in the subtitle chunks. A compressed subtitle bitmap will have the following fields:

```
WORD     width;
WORD     height;
WORD     left;
WORD     top;
WORD     right;
WORD     bottom;
struct {
    BYTE    red;
    BYTE    green;
    BYTE    blue;
} color_background, color_pattern, color_emphasis1, color_emphasis2;
BITMAP bitmap;
```

The "width" and "height" fields specify the dimension of the subtitle bitmap. The members "left", "top", "right", and "bottom" fields specify the display rectangle of the subtitle bitmap relative to the main video rectangle. The BITMAP includes compressed bitmap data.

In accordance with a preferred embodiment, the subtitle bitmaps are four-level bitmaps with the following definition.
00 Background pixel
01 Pattern pixel
10 Emphasis pixel—1
11 Emphasis pixel—2

Compression of the subtitle bitmap uses a simple run-length coding according the rules in Table 4. In accordance with an embodiment of the present invention, the size of the run-length coded data within one line is 1440 bits or less.

In accordance with a preferred embodiment of the present invention, the streams in AVI files are interleaved. Audio stream chunks are interleaved ahead of corresponding video stream chunks in time. The amount of the audio stream that is interleaved ahead of corresponding points in the video stream should not exceed an predetermined upper limit, e.g., 2 seconds, 5 seconds, 10 seconds, 15 seconds, etc. The subtitle chunks are interleaved in the file ahead of the corresponding video chunk in time, with the amount of subtitle interleaved ahead of corresponding points in the video stream not exceeding a upper limit, e.g., 5 seconds, 10 seconds, 15 seconds, 20 seconds, etc. The interleaving of the chapter stream is not restricted. It could be all written in the beginning of the "movi" list, or interleaved with the other streams.

TABLE 4

Subtitle bitmap coding rules

| Bitmap Pixels | Coding |
| --- | --- |
| 1 to 3 pixels with the same value follow(s). | Enter the number of pixel(s) followed in the first 2 bits and the pixel data in the next 2 bits. The 4 bits are considered to be one unit. |

TABLE 4-continued

Subtitle bitmap coding rules

| Bitmap Pixels | Coding |
| --- | --- |
| 4 to 15 pixels with the same value follows. | Specify '0' in the first 2 bits, and enter the number of pixels in the following 4 bits and the pixel data in the next 2 bits. The 8 bits are considered to be one unit. |
| 16 to 63 pixels with the same value follows. | Specify '0' in the first 4 bits, and enter the number of pixels in the following 6 bits and the pixel data in the next 2 bits. The 12 bits are considered to be one unit. |
| 64 to 255 pixels with the same value follows. | Specify '0' in the first 6 bits, and enter the number of pixels in the following 8 bits and the pixel data in the next 2 bits. The 16 bits are considered to be one unit. |
| The same pixels follow to the end of a line. | Specify '0' in the first 14 bits, and describe the pixel data in the following 2 bits. The 16 bits are considered to be one unit. |
| The byte alignment is not accomplished when the description for pixels on one line is completed. | Insert dummy data of 4 bits '0000b' for adjustment. |

An AVI file typically does not contain a time stamp of the streams. Each stream has its frame rate specified in the stream descriptor ('strl') list in the AVI header. For variable bit rate streams such as video streams or variable bit rate audio streams, each chunk contains one and only one frame. Accessing the data of the variable bit rate stream at any given point is feasible with the known frame rate and the data chunk index. For constant bit rate streams, e.g., constant bit rate audio streams, each chunk may contain one or more frames. Because each frame has a known fixed size, locating data at any given point can be achieved by calculating the size of the stream data. Therefore, seeking an arbitrary location in an AVI file in accordance with the present invention can be achieved for either constant bit rate or variable bit rate streams by parsing and recording the index table for each frame.

Many playback devices, particularly consumer electronics devices such as DVD players, are not able to input pointers to arbitrary points as can a slider bar used in computer software. For such devices, it is beneficial to only record the chapter location, i.e., the starting point of audio, video, and subtitles, while parsing the index. For a memory restricted player, it may be preferred for the player to remember index records at the minute points to reduce memory usage, thereby saving limited memory space. The full index is not required during normal forward play because the chunk is self-contained.

In accordance with the present invention, the version of the video codec used in AVI files is signaled by the FourCC code in the fccHandler field or member of the AVISTREAM-HEADER of the corresponding stream header 'strh' chunks, and the FourCC code bicompression field or member in the BITMAPINFOHEADER of the corresponding 'strf' chunks.

By way of example, for videos encoded according to a codec developed by DivX Networks, Inc., 10350 Science Center Drive, Building 14, Suite 140, San Diego, Calif. 92121, the FourCC codes fccHandler in the stream header ('strh') of the AVISTREAMHEADER is set to "divx" or "DIVX". Furthermore, the FourCC (DWORD) code biCompression in the BITMAPINFOHEADER of the corresponding 'strf' chunks is set to signify the detailed codec version.

Specifically by way of example, for version DivX 3.11, 'div3' or 'div4' is used in AVISTREAMHEADER, and 'div3' or 'div4' is used in BITMAPINFOHEADER; for version DivX 4.x, 'divx' is used in AVISTREAMHEADER, and 'divx' is used in BITMAPINFOHEADER; and for version DivX 5.x, 'divx' is used in AVISTREAMHEADER, and 'dx50' is used in BITMAPINFOHEADER.

By now it should be appreciated that a file format for storing digital data with a high compression rate has been described. A file format in accordance with the present invention is compatible with high level data compressing algorithms, such as MPEG-4. Its data compression ratio is about six to ten times higher than a standard DVD format. In accordance with the present invention, the file format is capable of storing data in multiple streams or tracks. The file format is also able to encode and archive video, audio, and text data on easily accessible streams or tracks. Furthermore, the file format is able to provide protection of the copyright of the digitized content.

While the invention is susceptible to various modifications and alternative constructions, certain illustrated embodiments thereof have been described above in detail. It should be understood, however, that there is no intention to limit the invention to the specific form or forms disclosed, but on the contrary, the intention is to cover all modifications, alternative constructions, and equivalents falling within the spirit and scope of the invention. The present invention is limited only by the claims that follow.

The invention claimed is:

1. A playback device configured to play data encoded in a multimedia file, comprising:
a processor configured to read the multimedia file;
wherein the multimedia file has at least one video track and includes a video stream descriptor list comprising:
   a video stream header chunk;
   a video stream format chunk following said video stream header chunk; and
   a video stream name chunk including a string indicating a video stream in said at least one video track;
said video stream descriptor list further comprising a video stream header data chunk in response to said at least one video track being a digital rights management (DRM) protected video, said video stream header data chunk following said video stream format chunk in said video stream descriptor list;
said video stream header data chunk in said video stream descriptor list including a DRM information data block comprising:
   a first member specifying a version of the DRM; and
   a second member specifying a protection of the DRM
said DRM information data block in said video stream header data chunk having a data structure defined as:

```
typedef __DRMinfo {
    WORD wVersion;
    STR sDRMinfo;
} DRMINFO.
```

2. The playback device of claim 1, said second member of said DRM information data block in said video stream header data chunk including an encrypted binary string.

3. The playback device of claim 1, said video stream header chunk in said video stream descriptor list including a four character code "vids" specifying video stream data in said at least one video track.

4. The playback device of claim 1, said video stream format chunk in said video stream descriptor list including data having a BITMAPINFOHEADER structure specifying a format of said at least one video track.

5. The playback device of claim 4, said video stream format chunk in said video stream descriptor list including palette information of said at least one video track.

6. The playback device of claim 4, said BITMAPINFOHEADER structure further specifying a version of the file.

7. The playback device of claim 1, said video stream name chunk in said video stream descriptor list including a null terminated text string "Video".

8. The playback device of claim 7, said null terminated text string "Video" in said video stream name chunk further including a description field describing said at least one video track.

9. The playback device of claim 1, wherein the multimedia file further includes a video stream data list comprising:
  at least one data chunk identified by a two digit stream index number followed by a two character code, said two character code being "db" in response to said least one data chunk being an uncompressed video frame and being "dc" in response to said least one data chunk being a compressed video frame; and
  in response to said at least one data chunk being a digital rights management (DRM) protected video frame, a DRM data chunk identified by said two digit stream index number followed by a two character code "dd", said DRM data chunk preceding said at least one data chunk and having DRM protection information.

10. The playback device of claim 9, each of said at least one data chunk in said video stream data list including data for one video frame.

11. The playback device of claim 9, said at least one data chunk in said video stream data list including an encoded data chunk having a bidirectional frame and a following predicting frame.

12. The playback device of claim 11, said at least one data chunk in said video stream data list further including an uncoded frame following said encoded data chunk.

13. The playback device of claim 1, wherein the multimedia file further includes at least one audio track and an audio stream descriptor list comprising:
  an audio stream header chunk;
  an audio stream format chunk following said audio stream header chunk; and
  an audio stream name chunk including a string indicating an audio stream in said at least one audio track.

14. The playback device of claim 13, said audio stream header chunk in said audio stream descriptor list including a four character code "auds" specifying audio stream data in said at least one audio track.

15. The playback device of claim 13, said audio stream format chunk in said audio stream descriptor list including data having a WAVEFORMATEX structure specifying a format of said at least one audio track.

16. The playback device of claim 13, said audio stream name chunk in said audio stream descriptor list including a null terminated text string "Audio".

17. The playback device of claim 16, said null terminated text string "Audio" in said audio stream name chunk further including a description field describing said at least one audio track.

18. The playback device of claim 13, further including an audio stream data list comprising at least one data chunk identified by a two digit stream index number followed by a two character code.

19. The playback device of claim 18, said two character code following said two digit stream index number in said audio stream data list being "wb".

20. The playback device of claim 18, each of said at least one data chunk in said audio stream data list including data for one audio frame in variable bit rate coding.

21. The playback device of claim 18, each of said at least one data chunk in said audio stream data list including data for at least one audio frame in constant bit rate coding.

22. The playback device of claim 18, wherein said at least one audio track is interleaved with said at least one video track.

23. The playback of claim 22, wherein said at least one audio track is interleaved ahead of said at least one video track by a time interval.

24. The playback device of claim 1, wherein the multimedia file further includes at least one chapter track and a chapter stream descriptor list comprising:
  a chapter stream header chunk;
  a chapter stream format chunk following said chapter stream header chunk; and
  a chapter stream name chunk including a string indicating a chapter stream in said at least one chapter track.

25. The playback device of claim 24, said chapter stream header chunk in said chapter stream descriptor list including a four character code "txts" specifying text stream data in said at least one chapter track.

26. The playback device of claim 24, said chapter stream name chunk in said chapter stream descriptor list including a null terminated text string "Chapter".

27. The playback device of claim 26, said null terminated text string "Chapter" in said chapter stream name chunk further including a description field describing said at least one chapter track.

28. The playback device of claim 24, wherein the multimedia file further includes a chapter stream data list comprising a data chunk identified by a two digit stream index number followed by a two character code.

29. The playback device of claim 28, said two character code following said two digit stream index number in said chapter stream data list being "ch".

30. The playback device of claim 1, wherein the multimedia files further includes at least one subtitle track and a subtitle stream descriptor list comprising:
  a subtitle stream header chunk;
  a subtitle stream format chunk following said subtitle stream header chunk; and
  a subtitle stream name chunk including a string indicating a subtitle stream in said at least one subtitle track.

31. The playback device of claim 30, wherein said at least one subtitle track is interleaved with said at least one video track in time.

32. The playback device of claim 31, wherein said at least one subtitle track is interleaved ahead of said at least one video track by a time interval.

33. The playback device of claim 30, said subtitle stream header chunk in said subtitle stream descriptor list including a four character code.

34. The playback device of claim 33, said four character code in said subtitle stream header chunk being "txts" in response to a text form subtitle.

35. The playback device of claim 33, said four character code in said subtitle stream header chunk being "vids" in response to a bitmap form subtitle.

36. The playback device of claim 35, said subtitle stream format chunk in said subtitle stream descriptor list including data having a BITMAPINFOHEADER structure specifying a format of said at least one subtitle track.

37. The playback device of claim 30, said subtitle stream name chunk in said subtitle stream descriptor list including a null terminated text string "Subtitle".

38. The playback device of claim 37, said null terminated text string "Subtitle" in said subtitle stream name chunk further including a description field describing said at least one subtitle track.

39. The playback device of claim 30, wherein the multimedia file further includes a subtitle stream data list comprising a data chunk identified by a two digit stream index number followed by a two character code.

40. The playback device of claim 39, said two character code following said two digit stream index number in said subtitle stream data list being "st" in response to a text form subtitle.

41. The playback device of claim 39, said two character code following said two digit stream index number in said subtitle stream data list being "sb" in response to a bitmap form subtitle.

42. A playback device configured to play data encoded in a multimedia file, comprising:
a processor configured to read the multimedia file;
wherein the multimedia file has at least one video track and includes a video stream descriptor list comprising;
a video stream header chunk;
a video stream format chunk following said video stream header chunk; and
a video stream name chunk including a string indicating a video stream in said at least one video track;
the file further having at least one chapter track and including a chapter stream descriptor list comprising:
a chapter stream header chunk;
a chapter stream format chunk following said chapter stream header chunk; and
a chapter stream name chunk including a string indicating a chapter stream in said at least one chapter track;
wherein said chapter stream format chunk in said chapter stream descriptor list including data having a TEXTINFO structure specifying a format of said at least one chapter track, said TEXTINFO structure being:

```
typedef _textinfo {
    WORD wCodePage;
    WORD wCountryCode;
    WORD wLanguageCode;
    WORD wDialect
} TEXTINFO.
```

43. A playback device configured to play data encoded in a multimedia file, comprising:
a processor configured to read the multimedia file;
wherein the multimedia file has at least one video track and includes a video stream descriptor list comprising:
a video stream header chunk;
a video stream format chunk following said video stream header chunk; and
a video stream name chunk including a string indicating a video stream in said at least one video track;
the file further having at least one chapter track and including a chapter stream descriptor list comprising:
a chapter stream header chunk;
a chapter stream format chunk following said chapter stream header chunk; and
a chapter stream name chunk including a string indicating a chapter stream in said at least one chapter track;
the file further including a chapter stream data list comprising a data chunk identified by a two digit stream index number followed by a two character code;
wherein said data chunk in said chapter stream data list having a structure defined as:

```
typedef struct _chapterchunk {
    FOURCC fcc;
    DWORD cb;
    STR time;
    STR description
} CHAPTERCHUNK
``` wherein:
the fcc element specifies a four character code "nnxx";
the cb element specifies a size of said structure;
the time element specifies a starting time of said at least one chapter track; and
the description element specifies a description of said at least one chapter track.

44. The playback device of claim 43, the time element in said data chunk in said chapter stream data list having a form [hh:mm:ss,xxx], wherein:
hh represents hours;
mm represents minutes;
ss represents seconds; and
mxxx represents milliseconds.

45. A playback device configured to play data encoded in a multimedia file, comprising:
a processor configured to read the multimedia file;
wherein the multimedia file has at least one video track and includes a video stream descriptor list comprising:
a video stream header chunk;
a video stream format chunk following said video stream header chunk; and
a video stream name chunk including a string indicating a video stream in said at least one video track;
further having at least one subtitle track and including a subtitle stream descriptor list comprising:
a subtitle stream header chunk;
a subtitle stream format chunk following said subtitle stream header chunk; and
a subtitle stream name chunk including a string indicating a subtitle stream in said at least one subtitle track;
wherein said subtitle stream header chunk in said subtitle stream descriptor list including a four character code, said four character code in said subtitle stream header chunk being "txts" in response to a text form subtitle;
wherein said subtitle stream format chunk in said chapter stream descriptor list including data having a TEXTINFO structure specifying a format of said at least one subtitle track, said TEXTINFO structure being:

```
typedef _textinfo {
    WORD wCodePage;
    WORD wCountryCode;
```

```
        WORD wLanguageCode;
        WORD wDialect
} TEXTINFO.
```

46. A playback device configured to play data encoded in a multimedia file, comprising:
a processor configured to read the multimedia file;
wherein the multimedia file has at least one video track and includes a video stream descriptor list comprising:
a video stream header chunk;
a video stream format chunk following said video stream header chunk; and
a video stream name chunk including a string indicating a video stream in said at least one video track;
the file further having at least one subtitle track and including a subtitle stream descriptor list comprising:
a subtitle stream header chunk;
a subtitle stream format chunk following said subtitle stream header chunk; and
a subtitle stream name chunk including a string indicating a subtitle stream in said at least one subtitle track;
the file further including a subtitle stream data list comprising a data chunk identified by a two digit stream index number followed by a two character code, said data chunk in said subtitle stream data list having a structure defined as:

```
typedef struct _subtitlechunk {
        FOURCC fcc;
        DWORD cb;
        STR duration;
        STR subtitle
} SUBTITLECHUNK
``` wherein:
the fcc element specifies a four character code "nnxx"; the cb element specifies a size of said structure;
the time element specifies a starting time and a ending time of said at least one subtitle track; and
the subtitle element includes:
a bitmap image in response to a bitmap form subtitle; and
a unicode text in response to a text form subtitle.

47. The playback device of claim 46, the duration element in said data chunk in said subtitle stream data list having a form [hh:mm:ss.xxx-HH:MM:SS.XXX], wherein:
hh and HH represent hours;
mm and MM represent minutes;
ss and SS represent seconds; and
xxx and XXX represent milliseconds.

48. A playback device configured to play data encoded in a multimedia file, comprising:
a processor configured to read the multimedia file;
wherein the multimedia file has at least one video stream, each including:
a video stream descriptor list comprising a video stream header chunk, a video stream format chunk, and a video stream name chunk; and
a video stream data list comprising a plurality of data chunks, each data chunk identified by a two digit stream index number followed by a two character code, said two character code being "db" in response to the data chunk being an uncompressed video frame and being "dc" in response to the data chunk being a compressed video frame; and
at least one audio stream, each including:
an audio stream descriptor list comprising an audio stream header chunk, an audio stream format chunk, and an audio stream name chunk; and
an audio stream data list comprising a plurality of data chunks, each data chunk identified by a two digit stream index number followed by a two character code "wb";
wherein said video stream descriptor list further comprising a video stream header data chunk in response to said at least one video stream being digital rights management (DRM) protected, said video stream header data chunk including a DRM information data block having a structure defined as:

```
typedef _DRMinfo {
        WORD wVersion;
        STR sDRMinfo;
} DRMINFO
``` wherein:
said element wVersion specifies a version of the DRM; and said element sDRMinfo specifies a protection of the DRM.

49. The playback device of claim 48, said at least one audio stream in being interleaved ahead of said at least one video stream in said file by a time interval, said time interval having an upper limit of approximately ten seconds.

50. The playback device of claim 48, said video stream header chunk in said video stream descriptor list including a four character code "vids" specifying video stream data in said at least one video stream.

51. The playback device of claim 48, said video stream format chunk in said video stream descriptor list including data having a BITMAPINFOHEADER structure specifying a format of said at least one video stream.

52. The playback device of claim 51, said video stream format chunk further including palette information of said at least one video stream.

53. The playback device of claim 48, said video stream name chunk in said video stream descriptor list including a null terminated text string "Video".

54. The playback device of claim 53, said video stream name chunk further including a description field describing said at least one video stream.

55. The playback device of claim 48, each of said plurality of data chunks in said video stream data list including data for one video frame.

56. The playback device of claim 48, said element sDRMinfo in said DRM information data block including an encrypted binary string.

57. The playback device of claim 48, said video stream data list further comprising a DRM data chunk identified by said two digit stream index number followed by a two character code "dd", said DRM data chunk preceding said data chunk and having DRM protection information.

58. The playback device of claim 48, said audio stream header chunk in said audio stream descriptor list including a four character code "auds" specifying audio stream data in said at least one audio stream.

59. The playback device of claim 48, said audio stream format chunk in said audio stream descriptor list including data having a WAVEFORMATEX structure specifying a format of said at least one audio stream.

60. The playback device of claim 48, said audio stream name chunk in said audio streamer descriptor list including a null terminated text string "Audio".

61. The playback device of claim 60, said null terminated text string "Audio" in said audio stream name chunk further including a description field describing said at least one audio stream.

62. The playback device of claim 48, each of said plurality of data chunks in said audio stream data list including data for one audio frame in variable bit rate coding.

63. The playback device of claim 48, each of said plurality of data chunks in said audio stream data list including data for at least one audio frame in constant bit rate coding.

64. The playback device of claim 48, said file further comprising at least one chapter stream, each including:
   a chapter stream descriptor list comprising a chapter stream header chunk, a chapter stream format chunk, and
   a chapter stream name chunk; and a chapter stream data list comprising a plurality of data chunks, each identified by a two digit stream index number followed by a two character code "ch".

65. The playback device of claim 64, said chapter stream header chunk in said chapter stream descriptor list including a four character code "txts" specifying a text stream data in said at least one chapter stream.

66. The playback device of claim 64, said chapter stream name chunk in said chapter stream descriptor list including a null terminated text string "Chapter".

67. The playback device of claim 66, said chapter stream name chunk further including a description field describing said at least one chapter stream.

68. The playback device of claim 48, said file further comprising at least one subtitle stream, each including:
   a subtitle stream descriptor list comprising a subtitle stream header chunk, a subtitle stream format chunk, and
   a subtitle stream name chunk; and a subtitle stream data list comprising a plurality of data chunks, each identified by a two digit stream index number followed by a two character code, said two character code being "st" in response to a text form subtitle and "sb" in response to a bitmap form subtitle.

69. The playback device of claim 68, said subtitle stream header chunk in said subtitle stream descriptor list including a four character code, said four character code being "txts" in response to a text form subtitle and "vids" in response to a bitmap form subtitle.

70. The playback device of claim 68, said subtitle stream name chunk in said subtitle stream descriptor list including a null terminated text string "Subtitle".

71. The playback device of claim 70, said subtitle stream name chunk further including a description field describing said at least one subtitle stream.

72. A playback device configured to play data encoded in a multimedia file, comprising:
   a processor configured to read the multimedia file;
   wherein the multimedia file has at least one video stream, each including:
      a video stream descriptor list comprising a video stream header chunk, a video stream format chunk, and a video stream name chunk; and
      a video stream data list comprising a plurality of data chunks, each data chunk identified by a two digit stream index number followed by a two character code, said two character code being "db" in response to the data chunk being an uncompressed video frame and being "dc" in response to the data chunk being a compressed video frame; and
   at least one audio stream, each including:
      an audio stream descriptor list comprising an audio stream header chunk, an audio stream format chunk, and an audio stream name chunk; and
   an audio stream data list comprising a plurality of data chunks, each data chunk identified by a two digit stream index number followed by a two character code "wb";
   wherein said file further comprising at least one chapter stream, each including:
      a chapter stream descriptor list comprising a chapter stream header chunk, a chapter stream format chunk, and
   a chapter stream name chunk; and a chapter stream data list comprising a plurality of data chunks, each identified by a two digit stream index number followed by a two character code "ch";
   wherein said chapter stream format chunk in said chapter stream descriptor list including data having a TEXTINFO structure specifying a format of said at least one chapter stream, said TEXTINFO structure being:

```
typedef _textinfo {
    WORD wCodePage;
    WORD wCountryCode;
    WORD wLanguageCode;
    WORD wDialect
} TEXTINFO.
```

73. A playback device configured to play data encoded in a multimedia file, comprising:
   a processor configured to read the multimedia file;
   wherein the multimedia file has at least one video stream, each including:
      a video stream descriptor list comprising a video stream header chunk, a video stream format chunk, and a video stream name chunk; and
      a video stream data list comprising a plurality of data chunks, each data chunk identified by a two digit stream index number followed by a two character code, said two character code being "db" in response to the data chunk being an uncompressed video frame and being "dc" in response to the data chunk being a compressed video frame; and
   at least one audio stream, each including:
      an audio stream descriptor list comprising an audio stream header chunk, an audio stream format chunk, and an audio stream name chunk; and
   an audio stream data list comprising a plurality of data chunks, each data chunk identified by a two digit stream index number followed by a two character code "wb"
   wherein said file further comprising at least one chapter stream, each including:
      a chapter stream descriptor list comprising a chapter stream header chunk, a chapter stream format chunk, and
   a chapter stream name chunk; and a chapter stream data list comprising a plurality of data chunks, each identified by a two digit stream index number followed by a two character code "ch";
   wherein said plurality of data chunks in said chapter stream data list having a structure defined as:

```
typedef struct _chapterchunk {
    FOURCC fcc;
    DWORD cb;
    STR time;
    STR description
) CHAPTERCHUNK
``` wherein:
  said fcc element specifies a four character code "nnxx";
  said cb element specifies a size of said structure;
  said time element specifies a starting time of said at least one chapter stream; and
  said description element specifies a description of said at least one chapter stream.

74. The playback device of claim 73, said time element having a form [hh:mm:ss.xxx], wherein:
  hh represents hours;
  mm represents minutes;
  ss represents seconds; and
  xxx represents milliseconds.

75. A playback device configured to play data encoded in a multimedia file, comprising:
  a processor configured to read the multimedia file;
  wherein the multimedia file has at least one video stream, each including:
    a video stream descriptor list comprising a video stream header chunk, a video stream format chunk, and a video stream name chunk; and
    a video stream data list comprising a plurality of data chunks, each data chunk identified by a two digit stream index number followed by a two character code, said two character code being "db" in response to the data chunk being an uncompressed video frame and being "dc" in response to the data chunk being a compressed video frame; and
  at least one audio stream, each including:
    an audio stream descriptor list comprising an audio stream header chunk, an audio stream format chunk, and an audio stream name chunk; and
    an audio stream data list comprising a plurality of data chunks, each data chunk identified by a two digit stream index number followed by a two character code "wb";
  wherein said file further comprising at least one subtitle stream, each including:
    a subtitle stream descriptor list comprising a subtitle stream header chunk, a subtitle stream format chunk, and
    a subtitle stream name chunk; and a subtitle stream data list comprising a plurality of data chunks, each identified by a two digit stream index number followed by a two character code, said two character code being "st" in response to a text form subtitle and "sb" in response to a bitmap form subtitle;
  wherein:
    in response to a bitmap form subtitle, said subtitle stream format chunk in said subtitle stream descriptor list includes data having a BITMAPINFOHEADER structure specifying a format of said at least one subtitle stream; and
    in response to a text form subtitle, said subtitle stream format chunk in said subtitle stream descriptor list includes data having a TEXTINFO structure specifying a format of said at least one subtitle stream, said TEXTINFO structure being:

```
typedef _textinfo {
    WORD wCodePage;
    WORD wCountryCode;
    WORD wLanguageCode;
    WORD wDialect
} TEXTINFO.
```

76. A playback device configured to play data encoded in a multimedia file, comprising:
  a processor configured to read the multimedia file;
  wherein the multimedia file has at least one video stream, each including:
    a video stream descriptor list comprising a video stream header chunk, a video stream format chunk, and a video stream name chunk; and
    a video stream data list comprising a plurality of data chunks, each data chunk identified by a two digit stream index number followed by a two character code, said two character code being "db" in response to the data chunk being an uncompressed video frame and being "dc" in response to the data chunk being a compressed video frame; and
  at least one audio stream, each including:
    an audio stream descriptor list comprising an audio stream header chunk, an audio stream format chunk, and an audio stream name chunk; and
    an audio stream data list comprising a plurality of data chunks, each data chunk identified by a two digit stream index number followed by a two character code "wb";
  wherein said file further comprising at least one subtitle stream, each including:
    a subtitle stream descriptor list comprising a subtitle stream header chunk, a subtitle stream format chunk, and
    a subtitle stream name chunk; and a subtitle stream data list comprising a plurality of data chunks, each identified by a two digit stream index number followed by a two character code, said two character code being "st" in response to a text form subtitle and "sb" in response to a bitmap form subtitle;
  wherein said plurality of data chunks in said subtitle stream data list having a structure:

```
typedef struct _subtitlechunk {
    FOURCC fcc;
    DWORD cb;
    STR duration;
    STR subtitle
) SUBTITLECHUNK
``` wherein:
  said fcc element specifies a four character code "nnxx";
  said cb element specifies a size of said structure;
  said time element specifies a starting time and a ending time of said at least one subtitle stream; and
  said subtitle element includes:
    a bitmap image in response to a bitmap form subtitle; and
    a unicode text in response to a text form subtitle.

77. A playback device configured to play data encoded in a multimedia file, comprising:
  a processor configured to read the multimedia file;
  wherein the multimedia file has a video stream, including:

a video stream descriptor list comprising a video stream header chunk, a video stream format chunk, a video stream header data chunk in response to said video stream being digital rights management (DRM) protected, and a video stream name chunk; and a video stream data list comprising a plurality of video data chunks, each video data chunk identified by a two digit stream index number followed by a two character code, said two character code being "db" in response to the video data chunk being an uncompressed video frame and being "dc" in response to the video data chunk being a compressed video frame;

an audio stream interleaved ahead of said video stream, including:

an audio stream descriptor list comprising an audio stream header chunk, an audio stream format chunk, and an audio stream name chunk; and an audio stream data list comprising a plurality of audio data chunks, each identified by a two digit stream index number followed by a two character code "wb"; and a subtitle stream interleaved ahead of said video stream, including:

a subtitle stream descriptor list comprising a subtitle stream header chunk, a subtitle stream format chunk, and a subtitle stream name chunk; and a subtitle stream data list comprising a plurality of subtitle data chunks, each identified by a two digit stream index number followed by a two character code, said two character code being "st" in response to a text form subtitle and "sb" in response to a bitmap form subtitle further comprising a chapter stream, including:

a chapter stream descriptor list comprising: a chapter stream header chunk having a four character code "txts";

a chapter stream format chunk having a TEXTINFO structure specifying a format of said chapter stream; and a chapter stream name chunk having a null terminated text string "Chapter"; and a chapter stream data list comprising a plurality of chapter data chunks, each identified by a two digit stream index number followed by a two character code "ch", said plurality of chapter data chunks having a structure:

```
typedef struct _chapterchunk {
    FOURCC fcc;
    DWORD cb;
    STR time;
    STR description
} CHAPTERCHUNK
``` wherein:

said fcc element specifies a four character code;

said cb element specifies a size of said structure;

said time element specifies a starting time of said at least one chapter stream; and said description element specifies a description of said at least one chapter stream.

78. The playback device of claim 77, wherein, in response to a video data chunk in said video stream data list being DRM protected, said video stream data list includes a DRM data chunk preceding said video data chunk, said DRM data chunk having DRM protection information and being identified by a two digit stream index number followed by a two character code "dd".

79. The playback device of claim 77, wherein each of said plurality of audio data chunks in said audio stream data list includes data for one audio frame in variable bit rate coding.

80. The playback device of claim 77, wherein each of said plurality of audio data chunks in said audio stream data list includes data for at least one audio frame in constant bit rate coding.

81. The playback device of claim 77, wherein:

said video stream header chunk includes a four character code "vids" specifying video stream data in said video stream;

said video stream format chunk includes data having a BITMAPINFOHEADER structure specifying a format of said video stream; said video stream name chunk includes a null terminated text string "Video";

said audio stream header chunk includes a four character code "auds" specifying audio stream data in said audio stream;

said audio stream format chunk includes data having a WAVEFORMATEX structure specifying a format of said audio stream;

said audio stream name chunk includes a null terminated text string "Audio";

said subtitle stream header chunk includes a four character code, said four character code being "txts" in response to a text form subtitle and "vids" in response to a bitmap form subtitle;

said subtitle stream format chunk includes, in response to a bitmap form subtitle, data having a BITMAPINFOHEADER structure and, in response to a text form subtitle, data having a TEXTINFO structure; and said subtitle stream name chunk includes a null terminated text string "Subtitle".

82. The playback device of claim 81, wherein said video stream format chunk further includes palette information of said video stream.

83. The playback device of claim 81, wherein:

said video stream name chunk in said video stream descriptor list further includes a description field describing said video stream;

said audio stream name chunk in said audio stream descriptor list further includes a description field describing said audio stream; and said subtitle stream name chunk in said subtitle stream descriptor list further includes a description field describing said subtitle stream.

84. The playback device of claim 77, wherein each of said plurality of video data chunks in said video stream data list includes data for one video frame.

85. The playback device of claim 77, wherein said plurality of video data chunk in said video stream data list include:

an encoded data chunk having a bidirectional frame and a following predicting frame; and an uncoded frame following said encoded data chunk.

* * * * *